United States Patent [19]
Finn et al.

[11] Patent Number: 5,553,907
[45] Date of Patent: Sep. 10, 1996

[54] RIGID FOAM VISOR

[75] Inventors: Joseph R. Finn, Waterford; James R. Jones, Dryden; Kirk Jensen, Novi, all of Mich.

[73] Assignee: Takata Inc., Auburn Hills, Mich.

[21] Appl. No.: 562,034

[22] Filed: Nov. 22, 1995

Related U.S. Application Data

[63] Continuation of Ser. No. 191,267, Feb. 3, 1994, abandoned.

[51] Int. Cl.$^6$ ........................................... B60J 3/02
[52] U.S. Cl. .................. 296/97.1; 296/97.12; 296/97.5
[58] Field of Search ...................... 296/97.1, 97.5, 296/97.9, 97.12

[56] References Cited

U.S. PATENT DOCUMENTS

| | | | |
|---|---|---|---|
| 3,542,416 | 11/1970 | Nelson | 296/97.1 |
| 4,411,467 | 10/1983 | Cziptschirsch et al. | |
| 4,521,046 | 6/1985 | Foggini | 296/97.12 |
| 4,610,477 | 9/1986 | Ebert et al. | |
| 4,664,435 | 5/1987 | Dietz et al. | 296/97.1 |
| 4,702,513 | 10/1987 | Ebert et al. | |
| 4,773,699 | 9/1988 | Cebollero | 296/97.5 X |
| 5,007,532 | 4/1991 | Binish | |
| 5,031,951 | 7/1991 | Binish | |
| 5,148,588 | 9/1992 | Prillard | 296/97.1 X |
| 5,184,867 | 2/1993 | Prillard | |
| 5,308,137 | 5/1994 | Viertel et al. | 296/97.1 |
| 5,318,336 | 6/1994 | Aymerich et al. | 296/97.12 X |
| 5,401,073 | 3/1995 | Viertel et al. | |
| 5,429,407 | 7/1995 | Buchheit et al. | |

*Primary Examiner*—Joseph D. Pape
*Attorney, Agent, or Firm*—Harness, Dickey & Pierce, PLC

[57] ABSTRACT

A sun visor or other accessory for a motor vehicle. The sun visor includes a body made of rigid foam in which various structures (such as a support pin, detent and pivot arm) are insert molded. The foam has a rigidity which is sufficient to support said sun visor without requiring any additional reinforcing structures such as a support frame, support wire or centerboard. The pivot arm and detent are provided within a casing that prevents the foam from affecting the operation of the detent. Also insert molded into the body of the visor are mounts for an illuminated vanity. Terminals from a power supply are mounted in predetermined positions relative to the body so that when the vanity is mounted to the body, contacts coupled to a lamp and mounted to the vanity in predetermined positions, are caused engage the terminals.

24 Claims, 2 Drawing Sheets

RIGID FOAM VISOR

This is a continuation of U.S. patent application Ser. No. 08/191,267, filed Feb. 3, 1994, now abandoned.

BACKGROUND AND SUMMARY OF THE INVENTION

The present invention generally relates to sun visor assemblies for motor vehicles. More particularly, this invention relates to a sun visor in which the body of the sun visor is formed from a rigid foam material.

Conventionally, motor vehicle sun visors employ one of a number of types of constructions. One construction uses a centerboard of polymeric material or cardboard. The centerboard is attached to a pivot rod that allows the sun visor to pivot about a vertical axis and rotate about a horizontal axis. A detent mechanism is typically used to maintain the sun visor in its stored or deployed positions. The centerboard also operates as the attachment for various other components or subassemblies of the sun visor, such as an illuminated vanity, and may also have slabs of foam mounted to it to cushion the sun visor.

Another common construction for sun visors uses what is known as a clam shell design. In this construction, the body or core of the sun visor is formed from the mating of two halves which are connected along one edge by a live hinge. When folded together, these halves (which are usually of a polymeric material) snap together to form the visor body. Each half of the clam shell may be provided with reinforcing ribs or other structures that enable it handle the rigors of normal visor use. The clam shell halves are also provided with various clips, embossments or other means that accommodate and locate the other elements of the visor assembly such as support pins, pivot rods, detent mechanisms, vanity assemblies and lead wires for operating an illumination system of the vanity. Generally, these additional components are either clipped to one of the clam shell halves, clamped between the two clam shell halves or attached by fasteners. As with the previous prior construction, the clam shell body may also be enclosed within a trim cover.

In another variety of sun visor construction, a reinforcing frame member, typically a wire, is provided to support the remainder of the visor body which may be formed of a foam or other type of material. Two types of reinforcements are generally seen. One is a perimeter wire which extends, as the name implies, around the perimeter of the visor body and the other is a bar which extends along the upper edge of the visor body, from the end of the pivot rod generally to and often through the support pin and the other end of the visor.

All of these prior construction techniques present difficulties since they are generally labor intensive, involve numerous manufacturing steps, use a large number of components, require a large on-hand inventory supply, and which result in complicated assembly procedures.

In view of the limitations of the above designs, the present invention has as one of its objects simplifying the construction of sun visors. To achieve this object, the present invention provides a sun visor having a rigid foam body or core. In the present invention, the core is sufficiently rigid to support the entire visor assembly without requiring any additional reinforcing members or structures in the visor body itself. The foam forming the body is also soft enough to comply with all National Highway Transportation Safety Administration safety standards for head impacts.

Another object of this invention is to provide a sun visor in which the features necessary for mounting the sun visor to the vehicle, maintaining it in the desired position and attaching a vanity assembly are insert molded within the visor body.

Yet another object of the present invention is to provide a casing in which the pivot rod and detent mechanism are positioned thereby increasing the ease with which the subassembly is handled prior to incorporation into the sun visor. It is also an object to protect the detent mechanism, pivot rod and lead wires from contamination or interference by the foam forming the body entering into the actual mechanisms and inhibiting their proper operation.

Yet another object of the present invention is to provide a sun visor in which it is no longer necessary to manually connect the contacts of the illumination system of the vanity assembly to the terminals of the power supply in the visor body. The present invention provides what are referred to as "battery-type" connections which achieve this object. As a result, during mounting of the vanity assembly to the visor body, the contacts of the illumination system are caused to engage terminals of the power supply.

In achieving the above objects, the sun visor assembly of the present invention is one which, when installed in the vehicle, can be moved between a stored position, a deployed position and numerous intermediate positions. In the stored position, the body of the visor lays generally against the headliner of the vehicle. In the deployed position, the body of the visor extends downward and away from the headliner.

The visor includes a visor body or core which is constructed from a rigid foam material. While a variety of foams can be used, the foam utilized with the present invention has a rigidity which is sufficient to support the sun visor without requiring any additional reinforcing structures such as the perimeter and other support wires as seen in prior sun visors. The foam material, preferably a urethane foam, is lightweight and meets all U.S. automotive safety standards for head impacts. The body of the visor is further enclosed within a trim cover made of a material such as vinyl or a textile.

In forming the visor body, the pivot arm and detent mechanism used to maintain the sun visor in its various positions, are insert molded with the visor body. To prevent the rigid foam from interfering with the operation of the pivot arm and detent mechanism, these structures are enclosed within a casing that not only prevents the foam from entering into and interfering with their operation, but also allows for easy and "clean" handling of the pivot arm and detent mechanism subassembly by an operator. In other words, the grease or other lubricant associated with the detent mechanism is enclosed by the casing. A support pin is also insert molded into the visor and is therefore retained in its position by the visor body itself.

Also insert molded into the visor body are the various mounting structures used to enable attachment of a vanity to the sun visor. These structures may take numerous forms. In one form, a recess opening in a mounting plate is used in conjunction with mounting bosses that are adapted to receive threaded fasteners.

The molded visor body or mounting plate also includes a recess or other means to which electrical terminals coupled to the power supply of the vehicle are received. The lead wires for the terminals are retained in the casing mentioned above until after molding. During molding, that portion of the casing which encloses the lead wires is pressed against one of the mold surfaces so that, after molding, a portion of the casing is exposed yet entrapped by the visor body. The casing is then slit open, the lead wires withdrawn and engaged with the terminals.

When the vanity subassembly is mounted to the visor body, it attaches at predetermined locations. On the back side of the vanity, electrical contacts for the illumination system are also positioned in predetermined locations so that when properly mounted to the visor body, the contacts on the vanity assembly are caused to electrically engage the terminals mounted to the visor body. Since both the terminals and the contacts are in predetermined positions, it is the mounting of the vanity assembly itself which causes engagement. Manual engagement between the two terminals is therefore rendered unnecessary.

Further objects, features and advantages of the present invention will become apparent to those skilled in the art to which this invention pertains from a consideration of the following description of the preferred embodiment and the appended claims when taken in connection with the accompanying drawings.

DETAILED DESCRIPTION OF THE PRESENT INVENTION

Figure 2:
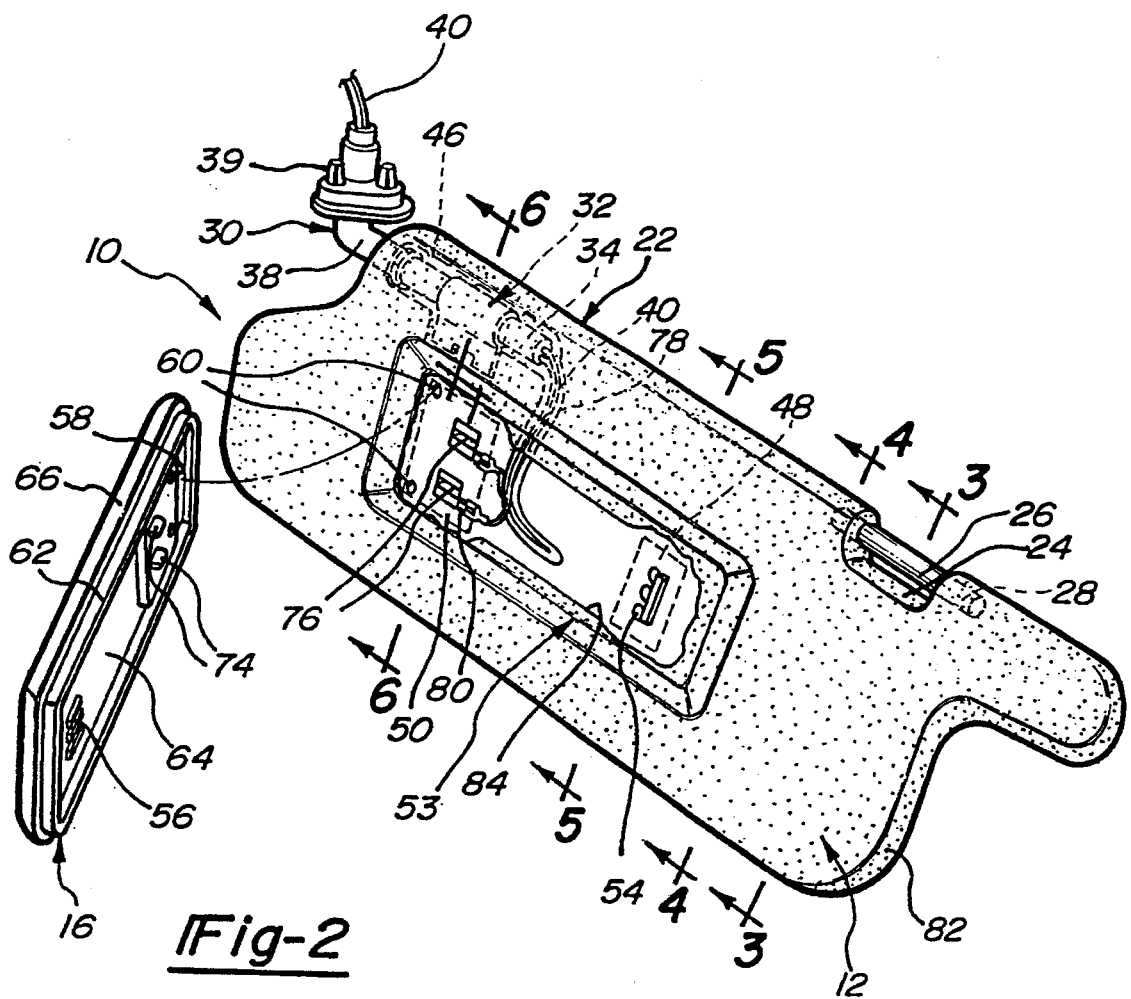
FIG. 2 is a perspective view of an entire sun visor according to the principles of the present invention.
Figure 3:
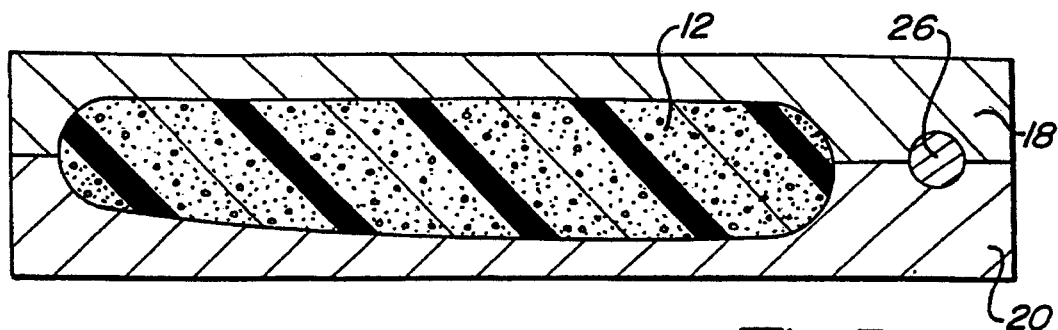
FIG. 3 is a sectional view taken substantially taken along line 3—3 in FIG. 2 of a sun visor, positioned within a mold, and being constructed according to the principles of the present invention.
Figure 4:
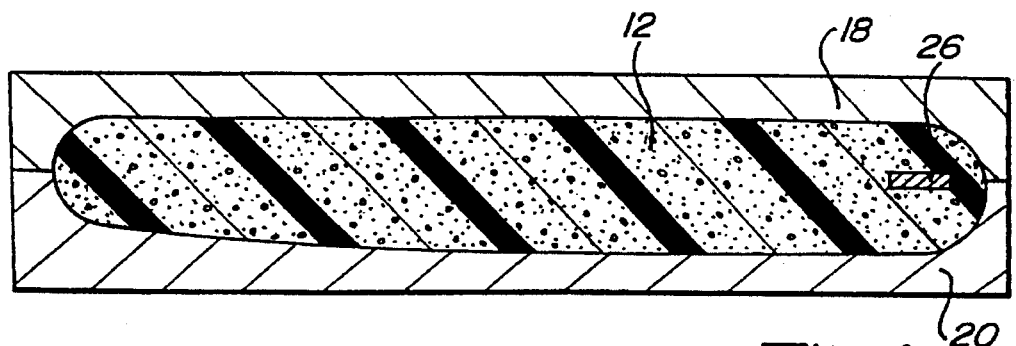
FIG. 4 is another sectional view, now taken substantially along line 4—4 in FIG. 2, of a sun visor embodying the principles of the present invention immediately after molding and while still contained with the mold.

Referring now to the figures, a sun visor assembly embodying the principles of the present invention is generally illustrated in FIG. 2 and designated as 10. The visor assembly 10 includes a body or core 12 which forms the panel that is used to shield the vehicle operator's eyes from the sun's glare or from a reflective surface. The visor body 12 is carried by a pivot/detent subassembly which allows the body 12 of the sun visor 10 to pivot about a vertical axis, thus enabling the sun visor 10 to be used with either the front windshield or side window of the vehicle, and rotated about a horizontal axis, thus allowing the sun visor 10 to be moved between a stored position where the body 12 is generally adjacent to the headliner of the vehicle and a deployed position where the body 12 of the sun visor 10 extends downward from the vehicle headliner. While only briefly outlined here, the pivot/detent subassembly 14 is more fully described below. The sun visor 10 further includes a vanity subassembly 16 which is also more fully described below.

The visor body 12 is formed from a rigid foam material. This foam is a type that is sufficiently rigid so as to satisfy all of the structural requirements of the visor body 12. In this manner, the need for additional reinforcing members, such as the perimeter support wires or edge supports seen in previous visors, is eliminated. As seen in the drawings, the various other components of the present invention which are provided within the visor body 12 are not provided to reinforce or add structural integrity to the body 12. In addition to being substantially rigid as described above, the foam forming the visor body 12 also meets all present U.S. automotive safety requirements for head impacts.

Any type of open or closed-cell foam that has sufficient rigidity, structural integrity, post-molding characteristics, durability, adhesion to trim cover materials (e.g., vinyl, cloth, etc.), surface aesthetics, fire resistance, thermal stability, and the like may be employed in the articles of the present invention. Urethane foams suitable for automotive interior trim substrates are preferred, with rigid (or semi-rigid) low density urethane foams being highly preferred.

Urethane foams suitable for the present invention are those typically made from a two component system suitable for open pour molding. One component is typically a polyol, preferably polyether or polyester polyol; the other an isocyanate, preferably a methylene diphenyl diisocyanate (MDI), polymeric diisocyanate (PMDI) or tolylene diisocyanate (TDI).

In a highly preferred embodiment, the automobile accessories of the present invention are constructed employing a commercially available two component system such as a RIMline® SL 87090/Rubinute® 8700 low density CFR-free S-RIM system available from ICI Americas, Inc. (RIMline® and Rubinute® are registered trademarks of ICI Americas, Inc.).

In constructing the sun visor 10 of the present invention, the components other than the vanity subassembly 16 are insert molded or foamed-in-place during formation of the body 12. The components therefore must be located within the mold halves 18 and 20 prior to formation of the visor body 12. The cavity formed between the mold halves 18 and 20 defines the shape of the visor body 12 and, along an upper edge 22 of the sun visor 10, a recess or indentation 24 is caused to be formed in the visor body 12. A support pin 26, clamped between the mold halves 18 and 20 at the portion which defines the recess 24, is positioned so that the opposing ends 28 of the support pin 26 are located within the mold cavity. When provided in this manner, upon completion of the foaming operation and forming of the visor body 12, the support pin 26 will traverse the recess 24 while being securely contained in the visor body 12 by the encapsulation of its ends 28 in the foam. While this is just one means by which the support pin 24 can be located and secured within the visor body 12, one skilled in the art will appreciate that numerous other methods for locating the support pin 26 could alternatively be used.

Figure 1:
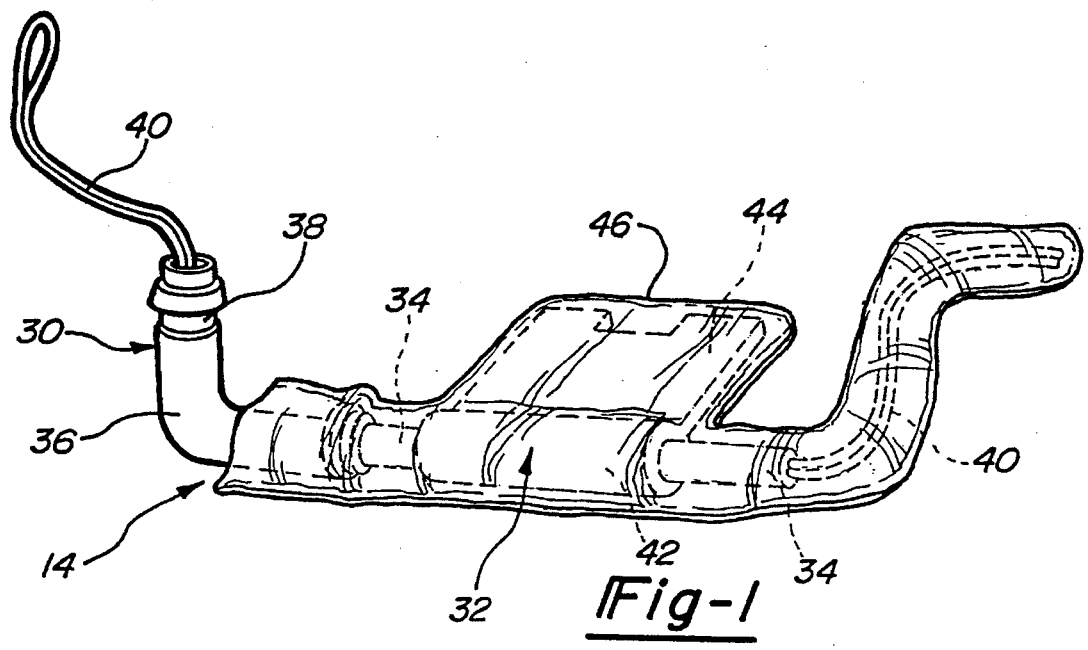
FIG. 1 is a perspective view of the lead wires, detent mechanism and pivot rod enclosed within a casing according to one aspect of the present invention.

Similar to the support pin 26, a portion of the pivot/detent subassembly 14 is also insert molded within the visor body 12. Referring now to FIGS. 1 and 2, the pivot/detent subassembly 14 includes a pivot or support rod 30 onto which a detent mechanism 32 is mounted or secured. The support rod 30 includes a horizontal segment 34 coupled through an elbow 36 to a vertical segment 38. A mounting bracket 39 is attached to the vertical segment 38 and enables the sun visor assembly 10 to be mounted via fasteners (not shown) to the headliner (not shown) of the vehicle. The elbow 36 operates as a bearing to permit relative movement of the horizontal and vertical segments 34 and 38. Also, the support rod 30 is hollow and lead wires 40, for the vanity subassembly 16, are extended therethrough.

Mounted to the horizontal segment 34, the detent mechanism 32 includes a substantially cylindrical barrel portion 42, located about the horizontal segment 34, and from which extends a planar tab 44. The detent mechanism 32 operates to secure the visor body 12 in its stored position, its deployed position or any desired intermediate position therebetween. Obviously, the tab 44 is provided so that the visor body 12 will be incapable of rotating relative to the detent mechanism 32 thus enabling the detent mechanism to retain the sun visor 10 in the desired position. The specific structure of the detent mechanism 32 is not further described in detail since any one of the numerous well known designs could be used with the present invention.

A lubricant, such as grease, is provided within the barrel 42 of the detent mechanism to reduce friction and increase the ease of rotation relative to the horizontal segment 34 of the support rod 30. This grease, however, presents a problem when it comes to handling of the pivot/detent subassembly 14 prior to molding of the visor body 12. To increase the ease with which the pivot/detent subassembly 14 is handled and to prevent the operator from contacting the grease of the subassembly 14 or from the grease coming into contact with other visor parts, a casing 46 is provided over a portion of the pivot/detent subassembly 14.

The casing 46 is made of a clear plastic which is heat sealed or diaelectrically welded along its edges generally in a shape conforming to the enclosed portion of the pivot/detent subassembly 14. In particular, the casing 46 encloses those portions of the pivot/detent subassembly 14 which are to be encapsulated by the foam forming the visor body 12. This generally includes the ends of the lead wires 40, the horizontal segment 38, a portion of the elbow 36 and the detent mechanism 32. From the above, it can be seen that, in addition to containing the lubricant, the casing 46 also prevents the foam from entering into the various crevices and recesses of the pivot/detent subassembly 14, particularly the detent mechanism 32, thereby ensuring that the foam will not interfere with proper operation of the detent mechanism 32 or rotating of the horizontal segment 34 relative to the remainder of the support rod 30.

Preferably, the casing is a clear plastic material which is compliant enough to allow the foam to substantially conform to the exterior shape of the pivot/detent subassembly 14. This allows for the visor body 12 to be securely retained on the pivot/detent subassembly 14 without exhibiting a looseness or "wobbling" characteristic. By utilizing clear plastic for the casing 46, it is possible for the pivot/detent subassembly 14 to be visually inspected prior to molding of the visor body 12, thereby further ensuring quality control over the sun visor assembly 10.

Figure 5:
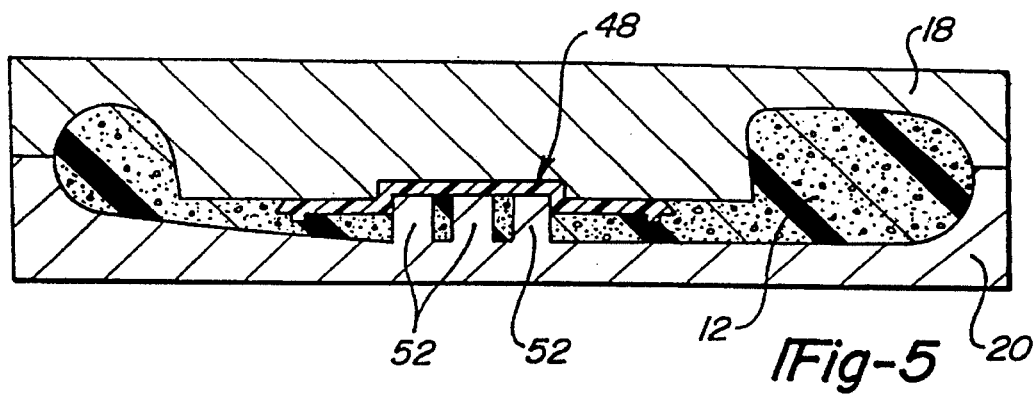
FIG. 5 is yet another sectional view, now taken substantially along line 5—5 in FIG. 2, of a sun visor embodying the principles of the present invention immediately after molding and while still contained with the mold.
Figure 6:
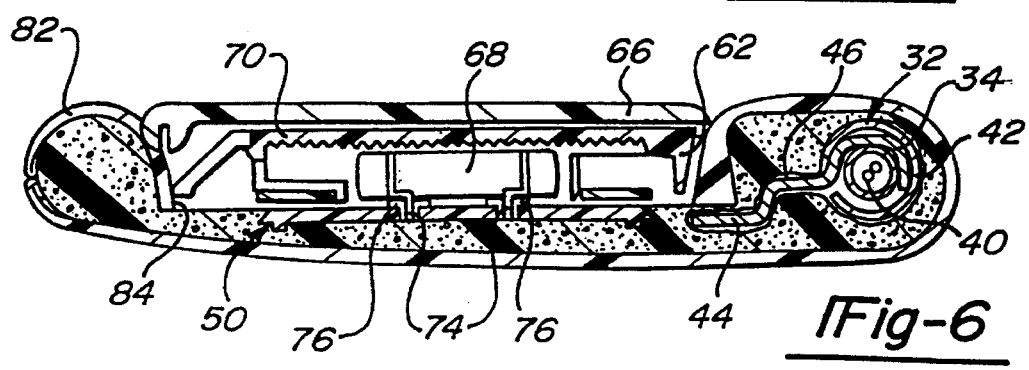
FIG. 6 is a sectional view taken substantially along line 6—6 in FIG. 2 of a sun visor embodying the principles of the present invention and showing various elements contained within the visor body.

Also insert molded in the visor body 12 are a pair of vanity mounting plates 48 and 50. To locate the mounting plates 48 and 50 during molding, the mold half 20 is provided with tabs, bosses or other structures 52 which will effectively locate and retain the mounting plates 48 and 50. As seen in FIG. 5, bosses 52 are being used to secure the mounting plate 48 to the mold half 18 in what will be a inset area 53 of the visor body 12. The inset area 53 enables the mounting of the vanity subassembly 16 so that it is generally flush with the remainder of the sun visor assembly 10. The bosses 52 also function to define recesses beneath openings 54 formed in the mounting plate 48. These openings 54 and recesses are configured to receive mounting tabs 56 formed on the rear side of the vanity subassembly 16.

To fully mount the vanity subassembly 16 to the visor body 12, the remaining end of the vanity subassembly 16 is secured by threaded fasteners (not shown) extended through apertures 58, defined in the vanity subassembly 16, and into mounting lugs 60 of the mounting plate 50 or through openings defined in the mounting plate and into the foam forming the visor body 12.

The vanity subassembly 16 is generally comprised of a frame 62 to which a mirror 64 is secured and a cover 66 is rotatably secured. Positioned to one side of the mirror 64 is the illumination assembly of the vanity 16 which includes a lamp 68 and a translucent cover 70. The lamp 68 is supported in the vanity subassembly 16 by a pair of metal supports 72 that are electrically coupled to or integrally formed with electrical contacts 74. In the present invention, the contacts 74 extend from the rear of the vanity subassembly 16 to form projections on the rear side thereof. The contacts 74 are provided in a predetermined location so that when the vanity subassembly 16 is mounted to the visor body 12, the contacts 74 will be necessarily engaged with terminals 76 already mounted to the visor body 12 in a corresponding predetermined location. As seen in FIG. 2, the terminals 76 are mounted to the visor body 12 by being press-fit or otherwise engaged through apertures in the mounting plate 50. This mounting, utilizing the predetermined locations of the contacts 74 and the terminals 76, is a "battery-type" connection that provides for coupling of the illumination assembly and lamp 68 to the power supply of the vehicle.

As mentioned above, the lead wires from the vehicle's power supply are inclusive in the casing 46. During molding, the portion of the casing 46 which encloses the lead wires 40 is located so that during molding, the casing 46 and lead wires 40 are pressed against the surface of the mold half 18 which defines the inset area 53 of the visor body 12. To accomplish this, the casing 46 and lead wires 40 may be actually attached to the mold half 48 or may be merely positioned so that during foaming of the visor body 12, the casing 46 and lead wires are caused to be pressed against the mold half 48 by the molding forces. When removed from the mold halves 18 and 20, it can be seen that, in FIG. 2, that the casing 46 and lead wires 46 are visible and accessible, yet retained in the visor body 12. The casing 46 can then be slit open or otherwise cut and the lead wires 40 pulled therefrom and provided with means for connecting them to the terminals 76.

This coupling of the lead wires 40 with the terminals 76 can be through a variety of means including directly soldering the lead wires 40 to the terminals 76 or providing the lead wires 40 with spade terminals 78 that engage blade terminals 80 extending from the body of the terminals 76. As seen from the above discussion, the casing 46 also operates to allow the lead wires 40 to be insert molded within the body of the visor 12 while enabling their further manipulation and attachment to terminals 76 associated with the vanity subassembly 16 and its illumination mechanism.

Once the visor body 12 has been molded the various components encapsulated therein, a trim cover 82 made of a textile, vinyl or other material is fitted over the visor body 12. This may necessitate the seaming of the trim cover along an edge thereof such as the upper edge 22 of the sun visor assembly 10. An opening 84 is provided in the trim cover 82 in the area of the inset portion 53 of the visor body 12. The opening 84 not only allows for access to the mounting plates 48 and 50 and attachment of the vanity subassembly 16, but also ensures that during the mounting of the subassembly 16, the trim cover 82 does not gather and wrinkle resulting in an unacceptable product.

Further objects, features and advantages of the invention will become apparent from a consideration of the following description and the appended claims when taken in connection with the accompanying drawings.

What is claimed is:

1. A sun visor or other accessory for a motor vehicle, said sun visor or other accessory being movable between a stored position and a deployed position and comprising:

a body made of rigid foam, said foam having a rigidity sufficient to self-support said body and said sun visor or other assembly without requiring additional reinforcing structures to be located within said foam and said body;

a cover which covers said body;

a pivot arm having first and second ends, said first end having mounting means for mounting said pivot arm and said sun visor or other accessory to the headliner of the vehicle, said second end being at least partially contained within said body; and detent means for maintaining said sun visor or other accessory in said stored position, said deployed position, and intermediate positions between said stored and deployed positions, said detent means being at least partially contained within said body and engaging said pivot arm.

2. A sun visor or other accessory as set forth in claim 1 further comprising a recess formed in one edge thereof.

3. A sun visor or other accessory as set forth in claim 2 wherein a support pin is mounted to said body so as to transverse said recess.

4. A sun visor or other accessory as set forth in claim 3 further comprising a support pin at least partially contained within said body and extending generally along an edge thereof.

5. A sun visor or other accessory as set forth in claim 1 wherein said rigid foam is an open cell foam.

6. A sun visor or other accessory as set forth in claim 1 wherein said rigid foam is a closed cell foam.

7. A sun visor or other accessory as set forth in claim 1 wherein said rigid foam is a urethane foam.

8. A sun visor or other accessory as set forth in claim 1 wherein said rigid foam is a low density urethane foam.

9. A sun visor or other accessory as set forth in claim 1 wherein said rigid foam is made from a two component system.

10. A sun visor or other accessory as set forth in claim 9 wherein one of said components is a polyol.

11. A sun visor or other accessory as set forth in claim 9 wherein one of said components is an isocyanate.

12. A sun visor or other accessory as set forth in claim 9 wherein one of said components is polyether.

13. A sun visor or other accessory as set forth in claim 9 wherein one of said components is polyester polyol.

14. A sun visor or other accessory as set forth in claim 9 wherein one of said components is a methylene diphenyl diisocyanate (MDI).

15. A sun visor or other accessory as set forth in claim 9 wherein one of said components is a polymeric diisocyanate (PMDI).

16. A sun visor or other accessory as set forth in claim 9 wherein one of said components is a tolylene diisocyanate (TDI).

17. A sun visor or other accessory for a motor vehicle, said sun visor or other accessory being movable between a stored position and a deployed position and comprising:

a body made of molded rigid foam, said body having an upper edge and a lower edge, when said sun visor or other accessory is in said deployed position said upper edge being located generally adjacent to a portion of the vehicle and said body extending generally downward and away therefrom;

a cover which covers said body;

a pivot arm having first and second ends, said first end having mounting means for mounting said pivot arm and said sun visor or other accessory to the vehicle, said second end molded-in-place to be at least partially contained within said body; and detent means engaging said pivot arm for maintaining said sun visor or other accessory in said stored position, said deployed position, and intermediate positions between said stored and deployed positions, said detent means molded-in-place so as to be contained within said body.

18. A sun visor or other accessory as set forth in claim 17 further comprising a support pin molded-in-place to be partially contained within said body and to extend generally along said upper edge.

19. A sun visor or other accessory as set forth in claim 17 further comprising a mounting means molded-in-place and being at least partially contained within said body, said mounting means for enabling attachment of a vanity assembly.

20. A sun visor or other accessory as set forth in claim 19 further comprising an illuminated vanity assembly mounted to said mounting means.

21. A sun visor or other accessory as set forth in claim 20 further comprising lead wires molded-in-place to be at least partially contained in said body, said lead wires adapted to provide electrical power to said illuminated vanity assembly.

22. A sun visor or other accessory as set forth in claim 21 further comprising access means for providing access to and further manipulation of said lead wires after said lead wires have been molded-in-place within said body.

23. A sun visor or other accessory as set forth in claim 21 wherein said lead wires are enclosed within a casing, said casing being molded-in-place so as to be at least partially encapsulated within said body.

24. A sun visor or other accessory as set forth in claim 23 wherein said casing is adapted to allow said lead wires to be at least partially withdrawn from said casing after being molded-in-place within said body for further manipulation and engagement with electrical terminals of said vanity assembly.

* * * * *